United States Patent
Muramatsu et al.

(10) Patent No.: US 11,121,591 B2
(45) Date of Patent: Sep. 14, 2021

(54) HOLLOW METAL PART OF STATOR OF ROTATING ELECTRICAL MACHINE, ROTATING ELECTRICAL MACHINE, AND MANUFACTURING PROCESS OF HOLLOW METAL PART

(71) Applicant: MITSUBISHI POWER, LTD., Kanagawa (JP)

(72) Inventors: Seijiro Muramatsu, Yokohama (JP); Takuma Yamaguchi, Yokohama (JP); Kenichi Hattori, Yokohama (JP); Toru Muto, Yokohama (JP); Yoichi Kotani, Yokohama (JP); Chuanhong Fan, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 385 days.

(21) Appl. No.: 16/000,521

(22) Filed: Jun. 5, 2018

(65) Prior Publication Data

US 2018/0351421 A1    Dec. 6, 2018

(30) Foreign Application Priority Data

Jun. 6, 2017    (JP) .............................. JP2017-111541

(51) Int. Cl.
*H02K 1/20*      (2006.01)
*H02K 9/19*      (2006.01)
(Continued)

(52) U.S. Cl.
CPC ................. *H02K 1/20* (2013.01); *H02K 9/19* (2013.01); *H02K 3/24* (2013.01); *H02K 5/20* (2013.01);
(Continued)

(58) Field of Classification Search
CPC .. H02K 1/06; H02K 1/08; H02K 1/20; H02K 3/04; H02K 3/22; H02K 3/24; H02K 3/46;
(Continued)

(56) References Cited

U.S. PATENT DOCUMENTS 3,634,705 A      1/1972   Fidei
2015/0340918 A1  11/2015  Bialik et al.

FOREIGN PATENT DOCUMENTS

CN    201191112 Y    2/2009
JP    55-077339 A    6/1980
(Continued)

OTHER PUBLICATIONS

Chinese Office Action dated Aug. 31, 2020 for Chinese Patent Application No. 201810569348.0.
(Continued)

*Primary Examiner* — Alex Torres-Rivera
*Assistant Examiner* — David A. Singh
(74) *Attorney, Agent, or Firm* — Volpe Koenig

(57) ABSTRACT

A hollow metal part is used as a pipe component for a refrigerant flow path of a rotating electrical machine adapted to cool a stator coil with a refrigerant. The rotating electrical machine includes a connection arm that couples the stator coil and a power supply terminal at a stator coil end portion of the stator coil, and an insulating hose that is coupled to the stator coil and the connection arm through a first hollow metal part in order to supply the refrigerant to the stator coil and the connection arm. The first hollow metal part is formed integrally by joining a part formed of stainless steel to a part made of oxygen-free copper.

9 Claims, 16 Drawing Sheets

(51) Int. Cl.
   *H02K 15/00* (2006.01)
   *H02K 9/22* (2006.01)
   *H02K 5/20* (2006.01)
   *H02K 3/24* (2006.01)
   *H02K 9/197* (2006.01)

(52) U.S. Cl.
   CPC .............. *H02K 9/197* (2013.01); *H02K 9/22* (2013.01); *H02K 15/0093* (2013.01)

(58) Field of Classification Search
   CPC H02K 3/50; H02K 3/505; H02K 5/04; H02K 5/20; H02K 5/225; H02K 9/005; H02K 9/19; H02K 9/193; H02K 9/22; H02K 15/0056; H02K 15/0068; H02K 15/0081; H02K 15/0093; H02K 3/44; H02K 9/197; H02K 9/20; F25B 21/00; F25B 2321/0021; F25B 2321/0022
   USPC .............................. 310/52, 54, 58, 59, 60 A
   See application file for complete search history.

(56) References Cited

FOREIGN PATENT DOCUMENTS

| | | | |
|---|---|---|---|
| JP | 61-099590 A | 5/1986 | |
| JP | 61099590 A * | 5/1986 | ............. B23K 20/00 |
| JP | 1997-140120 A | 5/1997 | |
| JP | 11-036025 A | 2/1999 | |
| JP | 2013-165585 A | 8/2013 | |
| SU | 576641 A1 | 10/1977 | |

OTHER PUBLICATIONS

Chinese Office Action dated Feb. 3, 2020 for the Chinese Patent Application No. 201810569348.0.
Korean Office Action dated Feb. 19, 2019 for the Korean Patent Application No. 10-2018-0063320.
Extended European Search Report dated Sep. 27, 2018 for the European Patent Application No. 18175913.5.
Chinese Office Action dated Jan. 12, 2021 for Chinese Patent Application No. 201810569348.0.

* cited by examiner

HOLLOW METAL PART OF STATOR OF ROTATING ELECTRICAL MACHINE, ROTATING ELECTRICAL MACHINE, AND MANUFACTURING PROCESS OF HOLLOW METAL PART

CLAIM OF PRIORITY

The present application claims priority from Japanese Patent application serial no. 2017-111541, filed on Jun. 6, 2017, the content of which is hereby incorporated by reference into this application.

BACKGROUND

Field of the Invention

The present invention relates to the structure of a rotating electrical machine, and more particularly, to an effective technology applicable to a piping component of a liquid-cooled rotating electrical machine that uses liquid to cool a stator coil.

Description of the Related Art

It is known that a liquid-cooled rotating electrical machine serving as a large-size rotating electrical machine used, for example, with thermal power generation equipment generally forms a stator coil with a hollow strand and flows pure water or other cooling liquid into the hollow strand in order to cool the stator coil and a connection ring. An insulating hose and a hollow metal part are used for the stator coil and the connection ring in order to supply or drain the cooling liquid.

In the abovementioned structure, hollow metal parts are employed for the stator coil and the insulating hose in order to form a cooling liquid flow path. Some of the employed hollow metal parts are fabricated by joining dissimilar metals. For example, the interface with a pipe component 18 shown in FIG. 16, which illustrates an exemplary piping structure of a related-art rotating electrical machine stator, and the interface with an insulating hose 6 disposed toward a header pipe 21 shown in FIG. 17 are structured by brazing the end of stainless steel with copper A technology described, for example, in Japanese Unexamined Patent Application Publication No. 2013-165585 is a background art for the field of the present invention. A stator coil connection device disclosed in Japanese Unexamined Patent Application Publication No. 2013-165585 is configured so that a conductor pipe in which a refrigerant flows includes a first end, a second end positioned opposite the first end, and an intermediate portion connecting the first end to the second end, and that the first end, the second end, and the intermediate Portion are formed integrally with each other, and further that at least the intermediate portion is flexible.

A superconducting rotating electrical machine disclosed in Japanese Unexamined Patent Application Publication No. Hei 9(1997)-140120 connects a radiation shield, a refrigerant takeout pipe, or a torque tube to a refrigerant supply pipe or a refrigerant exhaust pipe through a dissimilar joint manufactured by diffusion bonding such as explosive bonding, hot pressing, or HIP (hot isostatic pressing).

SUMMARY OF THE INVENTION

Meanwhile, a stator coil end of a rotating electrical machine vibrates due, for instance, to electromagnetic vibration. Therefore, high repetitive stress is applied to a hollow metal part used for the stator coil end. If the repetitive stress exceeds a fatigue limit, a highly stressed portion may crack.

Consequently, the material for the hollow metal part can be changed to a high-strength material. However, when the hollow metal part is to be changed after a change in the quality of the material for interfaces (both end faces), joining is obstructed by oxide film of the high-strength material as far as a related-art method is employed. It is therefore desirable that the strength of the highly stressed portion be increased without changing the quality of at least the material for the interfaces.

According to a joining method described in conjunction with a previous embodiment, austenite stainless steel is used to join only the interfaces on opposing ends by vacuum-brazing oxygen-free copper. However, this method does not provide adequate joining strength for joining the austenite stainless steel to the oxygen-free copper. Further, water enters a gap between the interfaces because an employed part is structured so that a liquid flows into a hollow portion. This may cause crevice corrosion.

Furthermore, when the high-strength material (e.g., austenite stainless steel) is exposed to a temperature of 600° C. to 700° C., chromium and carbon combine to precipitate chromium carbide. The vicinity of the precipitated chromium carbide lacks chromium to decrease corrosion resistance. It is known that when great stress is applied to a region lacking in chromium, localized corrosion occurs along a grain boundary to incur stress corrosion cracking.

Moreover, the hollow metal part fabricated by joining dissimilar metals as described in conjunction with a previous embodiment has a primary portion formed of austenite stainless steel. Therefore, the hollow metal part has high electric resistance. Flowing an electrical current to the hollow metal part causes it to overheat. Consequently, the hollow metal part is not suitable as an electrically conductive part and cannot be used for a real machine.

A coil connection member described in Japanese Unexamined Patent Application Publication No. 2013-165585 is fabricated, for example, by brazing parts forming the conductor pipe. Therefore, the electrical conductivity of the coil connection member is assured. However, the strength of a junction with respect to vibration or other stress is substantially the same as previously attained strength.

Meanwhile, the dissimilar joint 20 described in Japanese Unexamined Patent Application Publication No. Hei 9(1997)-140120 is formed by subjecting a refrigerant exhaust pipe material 21 and a refrigerant takeout pipe material 22 to explosive bonding or diffusion bonding, such as hot pressing or HIP. This increases the strength of the junction. However, the electrically conductive part is not targeted so that the overall electrical conductivity of the dissimilar joint 20 is not taken into consideration.

As described above, all the related-art uses of the hollow metal part involve the application of a method of joining non-current-carrying and dissimilar metals that is based on brazing or welding. There has been no report of the use of a hollow metal part for simultaneous flow of electrical current and fluid or the application of a bonding method other than brazing, that is, for example, an HIP diffusion bonding method.

The present invention has been made in view of the above circumstances, and provides a hollow metal part of a stator of a rotating electrical machine that is excellent in mechanical strength and corrosion resistance and usable as an electrically conductive part without having to change the quality of the material for an interface with another part. The present invention further provides a manufacturing process for the hollow metal part.

According to an aspect of the present invention, there is provided a hollow metal part of a stator of a rotating electrical machine that is used as a pipe component for a refrigerant flow path of the rotating electrical machine adapted to cool a stator coil with a refrigerant. The rotating electrical machine includes a connection ring and an insulating hose. The connection ring couples the stator coil and a power supply terminal to a stator coil end portion of the stator coil. The insulating hose is coupled to the stator coil and the connection ring through a first hollow metal part in order to supply the refrigerant to the stator coil and the connection ring. The first hollow metal part is formed integrally by joining a part formed of stainless steel to a part made of oxygen-free copper.

According to another aspect of the present invention, there is provided a process for manufacturing a hollow metal part. The process includes the steps of: (a) combining a part formed of stainless steel with a part made of oxygen-free copper; (b) injecting the combination of the part formed of stainless steel and the part made of oxygen-free copper into a steel capsule, supplying a metal material to the steel capsule, and filling the metal material into a space in the steel capsule; (c) performing a hot isostatic pressing (HIP) process on the steel capsule, the metal material, the part formed of stainless steel, and the part made of oxygen-free copper; (d) after the step (c), machine-cutting the steel capsule and the metal material; and (e) forming a through hole in the part formed of stainless steel and the part made of oxygen-free copper.

The aspects of the present invention provide a hollow metal part of a stator of a rotating electrical machine that is excellent in mechanical strength and corrosion resistance and usable as an electrically conductive part without having to change the quality of the material for an interface with another part. The aspects of the present invention further provide a process for manufacturing the hollow metal part.

The other problems, configurations, and advantageous effects will become apparent from the following description of embodiments.

BRIEF DESCRIPTION OF THE DRAWINGS

Embodiments of the present invention will be described in detail based on the following figures, in which.

DETAILED DESCRIPTION OF THE INVENTION

Figure 1:
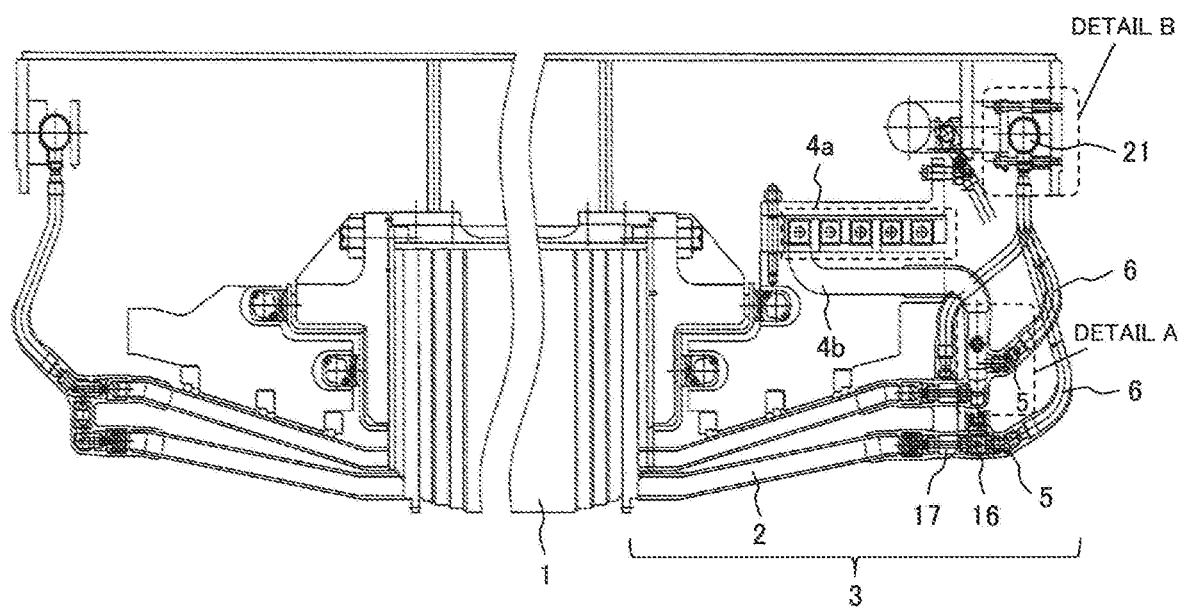
FIG. 1 is a longitudinal sectional view illustrating a stator of a liquid-cooled rotating electrical machine according to an embodiment of the present invention.

Embodiments of the present invention will now be described with reference to the accompanying drawings. Like elements in the drawings are designated by the same reference numerals and will not be redundantly described in detail.

First Embodiment

Figure 19:
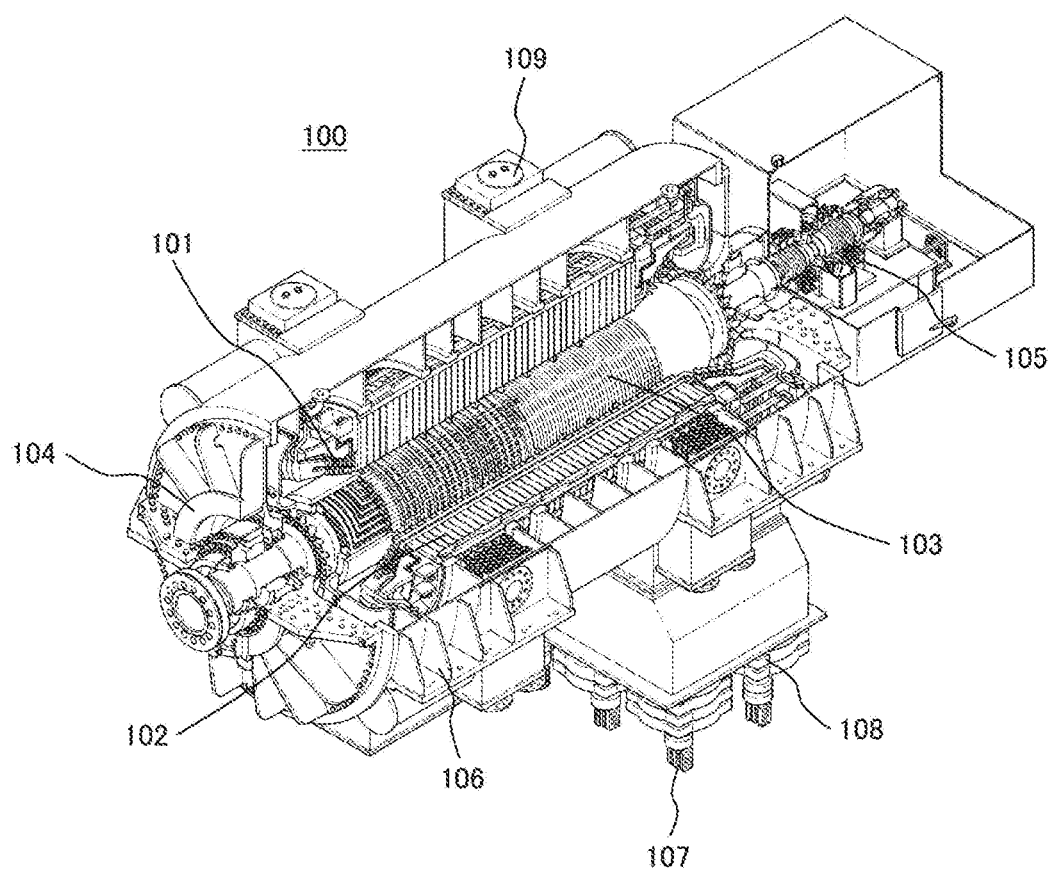
FIG. 19 is a perspective view illustrating an overall configuration of a typical rotating electrical machine.

First of all, a rotating electrical machine according to an embodiment of the present invention will be described with reference to FIG. 19. In general, rotating electrical machines (generators) are roughly classified by output (capacity) into three types, namely, water-cooled rotating electrical machines, hydrogen-cooled rotating electrical machines, and air-cooled rotating electrical machines. FIG. 19 shows a water-cooled rotating electrical machine. The water-cooled rotating electrical machine cools its inside with hydrogen gas and directly cools a stator winding. Therefore, the water-cooled rotating electrical machine has a large cooling capacity and is used for large-capacity equipment.

The water-cooled rotating electrical machine 100 mainly includes a stator coil (stator winding) 101, a stator core 102, a rotor 103, and a hydrogen cooler 109. The rotor 103 is disposed inside the stator coil 101 and stator core 102. The hydrogen cooler 109 cools the inside of the water-cooled rotating electrical machine 100 by using hydrogen gas. The water-cooled rotating electrical machine 100 further includes an end bracket 104, a brush gear 105, a footing 106, a current transformer 108, and a high voltage bushing 107. The footing 106 is used to install and secure the water-cooled rotating electrical machine 100. The current transformer 108 outputs electrical power generated by the water-cooled rotating electrical machine 100 to the outside. The stator coil (stator winding) 101 is formed of a hollow strand so that the stator coil (stator winding) 101 can be cooled by flowing water or other refrigerant into the inside.

For example, a turbine generator for thermal power generation generates electrical power by transmitting the rotational energy of a steam or gas turbine to the rotor 103 and rapidly rotating the rotor 103 inside the stator coil (stator winding) 101 and stator core 102.

A hollow metal part of a stator of a rotating electrical machine according to a first embodiment of the present invention will now be described with reference to FIGS. 1 to 3. FIG. 1 is a longitudinal sectional view illustrating a part of a stator of a turbine generator. The stator of a water-cooled turbine generator includes a stator core 1 and a stator coil 2. The stator core 1 is formed by stacking silicon steel sheets in the axial direction. The stator coil 2 is embedded in the stator core 1. Additionally, for example, a connection ring 4a and connection arm 4b and an insulating hose 6 are attached to the stator. The connection ring 4a and connection arm 4b couples the stator coil 2 and a power supply terminal at a stator coil end portion 3. The insulating hose 6 couples the stator coil 2 and the connection arm 4b through, for example, the hollow metal part 5, 16, 17 to header pipe 21 for cooling liquid supply purposes.

Figure 2:
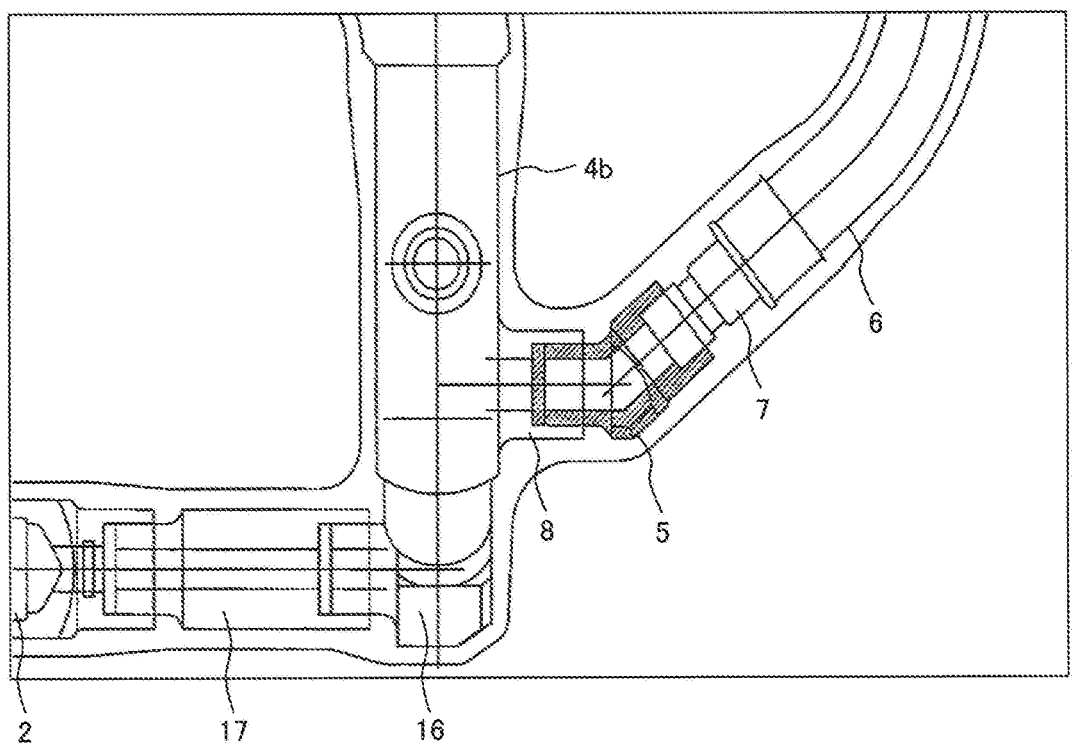
FIG. 2 is an enlarged view of detail A of FIG. 1.

FIG. 2 is an enlarged view of detail A of FIG. 1. As illustrated in FIG. 2, the connection arm 4b and the insulating hose 6 are connected through a hollow metal part 5. One end of the hollow metal part 5 serves as a socket. A nipple 7 attached to the leading end of the insulating hose 6 is inserted into the socket and braze-connected to the socket. Meanwhile, the other end of the hollow metal part 5, which is to be connected to the connection arm 4b, is inserted into a connection arm connecting port 8 and connected to the connection arm connecting port 8 by brazing.

Figure 3:
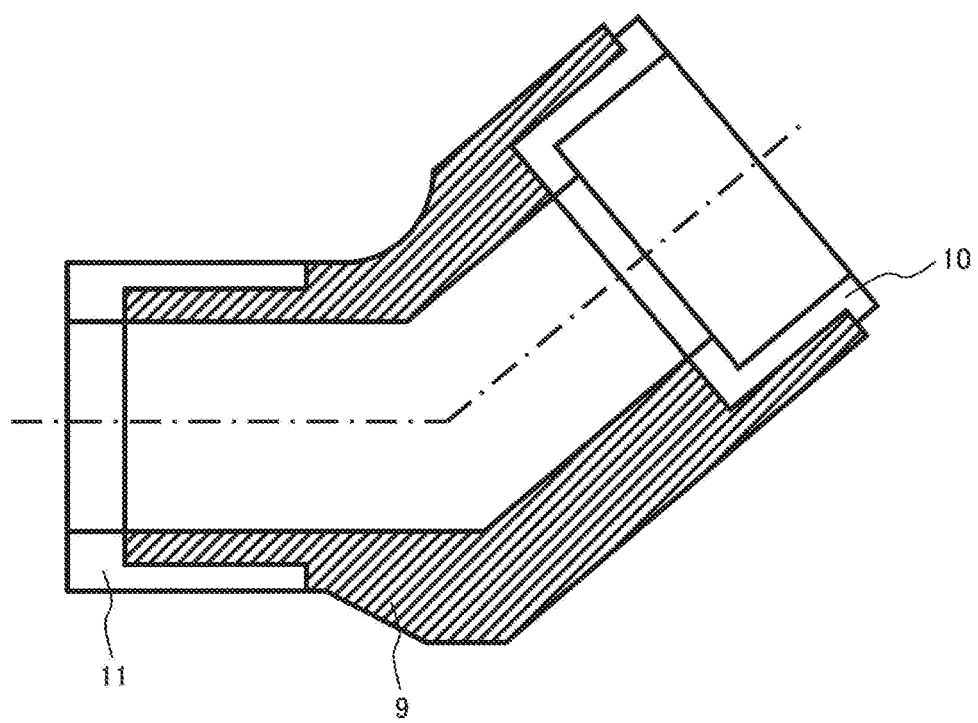
FIG. 3 is a diagram illustrating a hollow metal part according to an embodiment (first embodiment) of the present invention.

FIG. 3 illustrates a detailed structure of the hollow metal part 5 according to the present embodiment. In the present embodiment, a main material (shown at 9 in FIG. 3) for the hollow metal part 5 is changed from previously employed oxygen-free copper to austenite stainless steel 9. Due to this change, oxide film is formed on the surface of stainless steel in atmospheric air. Therefore, for example, a special environment and equipment for vacuum brazing or HIP diffusion bonding need to be prepared. Such preparations cannot easily be made in the field.

Consequently, the hollow metal part according to the present embodiment has a new hollow metal part structure. More specifically, as illustrated in FIG. 3, the hollow metal part according to the present embodiment is formed of a stainless steel hollow metal part body (elbow body) 9 whose stress concentration portion is formed of stainless steel, a cup made of oxygen-free copper 10 serving as an interface with the nipple 7 of the insulating hose, and a sleeve made of oxygen-free copper 11 serving as an interface with the connection arm connecting port 8. A junction between the stainless steel hollow metal part body 9 and the cup made of oxygen-free copper 10 and a junction between the stainless steel hollow metal part body 9 and the sleeve made of oxygen-free copper 11 are formed, for example, by HIP diffusion bonding under proper temperature control. The present embodiment provides a stator of a liquid-cooled rotating electrical machine that does not crack the bends of the hollow metal part 5 and has excellent corrosion resistance.

A process for manufacturing a hollow metal part according to the present embodiment will now be described with reference to FIGS. 18A to 18F. The following description deals with a process of joining members together by using an HIP (hot isostatic pressing) diffusion bonding method.

Figure 18A:
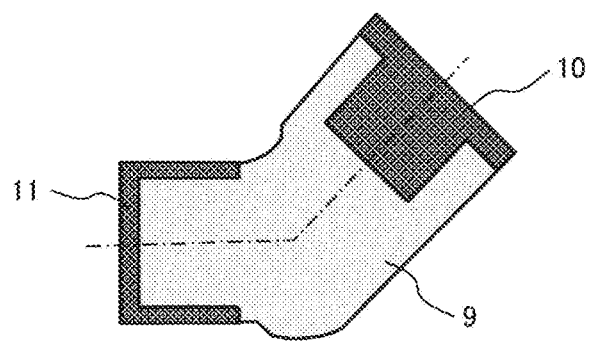
FIG. 18A is a diagram illustrating the process for manufacturing the hollow metal part according to an embodiment (first embodiment) of the present invention.

First of all, as illustrated in FIG. 18A, the stainless steel hollow metal part body 9, the cup made of oxygen-free copper 10, and the sleeve made of oxygen-free copper 11, which are the materials for the hollow metal part, are machined into a desired shape and combined together (step 1).

Figure 18B:
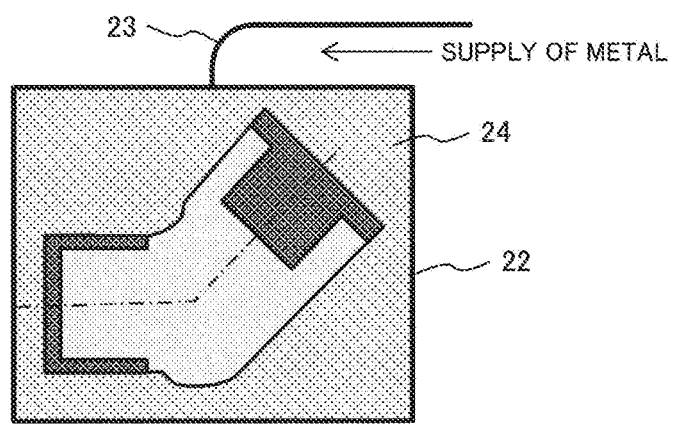
FIG. 18B is a diagram illustrating the process for manufacturing the hollow metal part according to an embodiment (first embodiment) of the present invention.

Next, as illustrated in FIG. 18B, a material for the hollow metal part and a metal material 24 are injected into a steel capsule 22, and the whole space (gap) in the steel capsule 22 is filled with the metal material 24 (step 2).

Figure 18C:
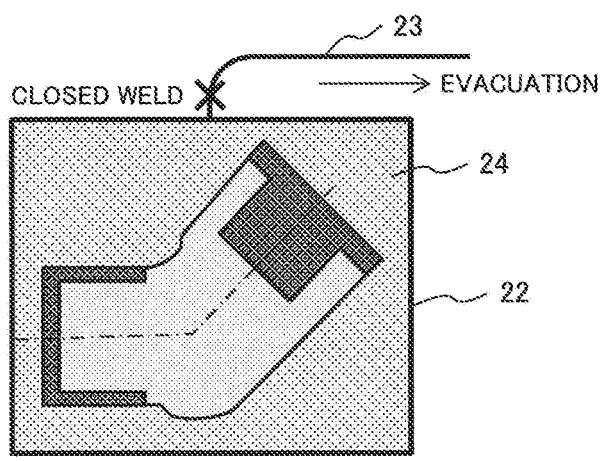
FIG. 18C is a diagram illustrating the process for manufacturing the hollow metal part according to an embodiment (first embodiment) of the present invention.

Then, as illustrated in FIG. 18C, the steel capsule 22 is closed by welding and evacuated through a piping 23, and a part of the piping 23 is closed by welding (step 3).

Figure 18D:
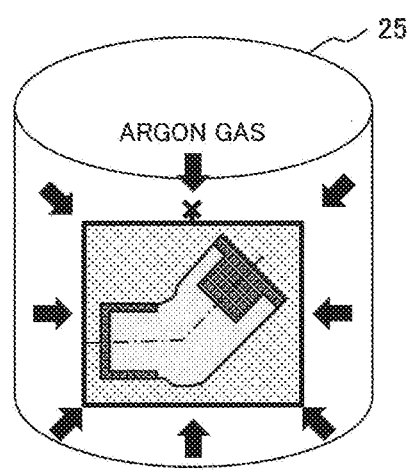
FIG. 18D is a diagram illustrating the process for manufacturing the hollow metal part according to an embodiment (first embodiment) of the present invention.

Subsequently, as illustrated in FIG. 18D, the steel capsule 22 is disposed in an HIP processing equipment 25, and argon gas (Ar) is supplied into the HIP processing equipment 25 to perform an HIP (hot isostatic pressing) process at a processing temperature of 900 to 1100° C. and a processing pressure of 120 MPa. HIP processing conditions, such as the processing temperature, the processing pressure, and processing time, are set appropriately in accordance, for example, with the size, shape, and type of a target material (step 4).

In order to secure junction reliability of an HIP junction, temperature control should preferably be exercised so that the HIP junction is exposed to a sensitization temperature range of 600° C. to 700° C. for a total period of not longer than 20 hours during the HIP (hot isostatic pressing) process.

Figure 18E:
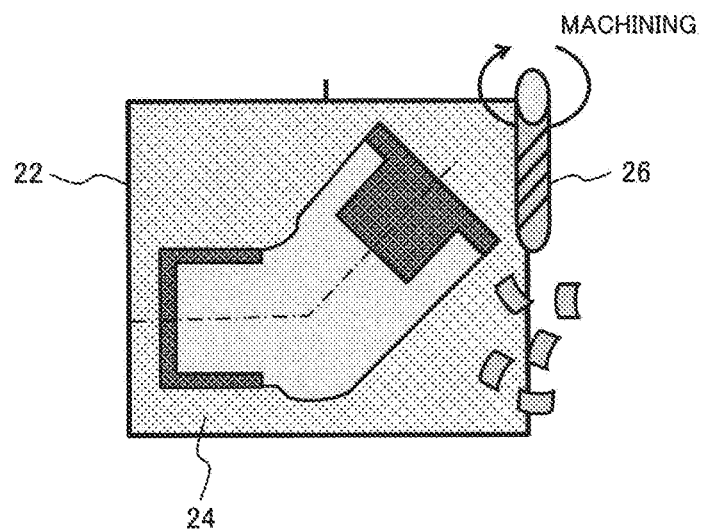
FIG. 18E is a diagram illustrating the process for manufacturing the hollow metal part according to an embodiment (first embodiment) of the present invention.

Subsequently, as illustrated in FIG. 18E, the steel capsule 22 and the metal material 24 are cut with a machining device 26 to check the junction between the materials for the hollow metal part (step 5).

Figure 18F:
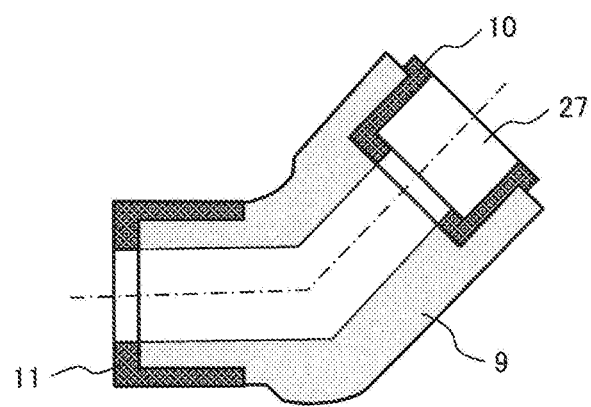
FIG. 18F is a diagram illustrating the process for manufacturing the hollow metal part according to an embodiment (first embodiment) of the present invention.

Finally, as illustrated in FIG. 18F, a through hole 27 through which pure water or other refrigerant flows is formed by machining to finish the hollow metal part according to the present embodiment, which is shown in FIG. 3.

Second Embodiment

Figure 4:
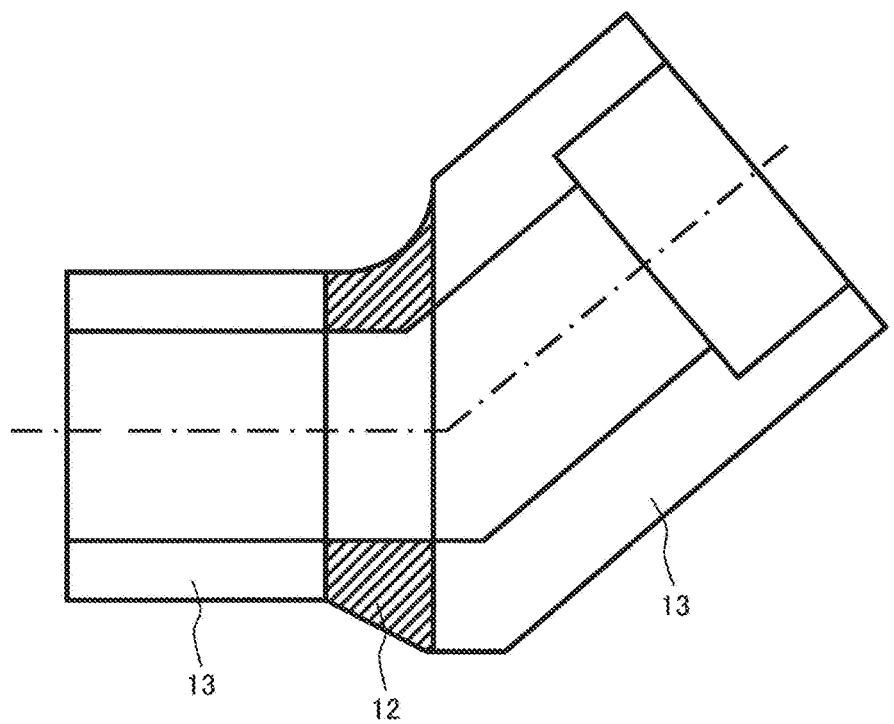
FIG. 4 is a diagram illustrating the hollow metal part according to an embodiment (second embodiment) of the present invention.

A hollow metal part according to a second embodiment of the present invention and the process for manufacturing the hollow metal part will now be described with reference to FIGS. 4 and 5. FIG. 4 corresponds to FIG. 3 of the first embodiment and illustrates the structure of the hollow metal part 5 according to the second embodiment. In the second embodiment, the hollow metal part 5 is structured so that only the bends (highly stressed portions) of the hollow metal part 5 is formed of stainless steel 12, and that the stainless steel 12 is sandwiched between opposing ends of the hollow metal part 5 that are made of oxygen-free copper 13.

Figure 5:
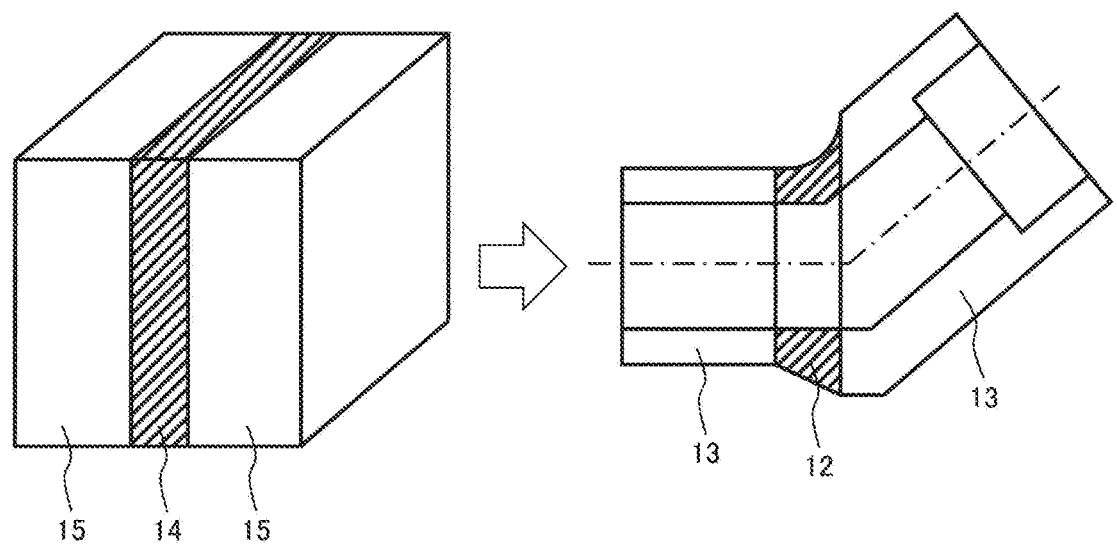
FIG. 5 is a diagram illustrating a process for manufacturing the hollow metal part according to an embodiment (second embodiment) of the present invention.

FIG. 5 is a conceptual diagram illustrating the process for manufacturing the hollow metal part 5 according to the present embodiment. In advance, a stainless steel block material 14 and oxygen-free copper block materials 15 are formed. The stainless steel block material 14 corresponds to the bends (highly stressed portions) of the hollow metal part 5. The oxygen-free copper block materials 15 correspond to the opposing ends of the hollow metal part 5. Next, a bonding process is performed by HIP so that the stainless steel block material 14 is sandwiched between the oxygen-free copper block materials 15. This HIP processing is performed by using a processing method described with reference, for example, to FIGS. 18A to 18F of the first embodiment. Finally, the hollow metal part 5 having a desired shape is cut out from the HIP-bonded block materials.

Even when the hollow metal part 5 is configured according to the present embodiment, the present embodiment provides the same advantageous effects as the first embodiment. Further, the present embodiment cuts out the hollow metal part 5 from the HIP-bonded block materials and is thus able to handle the hollow metal part 5 having various bend angles. Particularly, in contrast to the first embodiment, the present embodiment performs machine-cutting after HIP diffusion bonding instead of performing HIP diffusion bonding after machining the members of the hollow metal part 5. Therefore, it can be expected that machining and inspection costs will decrease. Moreover, even if the surfaces of the materials corrode, the corroded surfaces are cut out during manufacture. This makes it possible to renew the machined surfaces of a product at all times and store the block materials for a long period of time.

Third Embodiment

Figure 6:
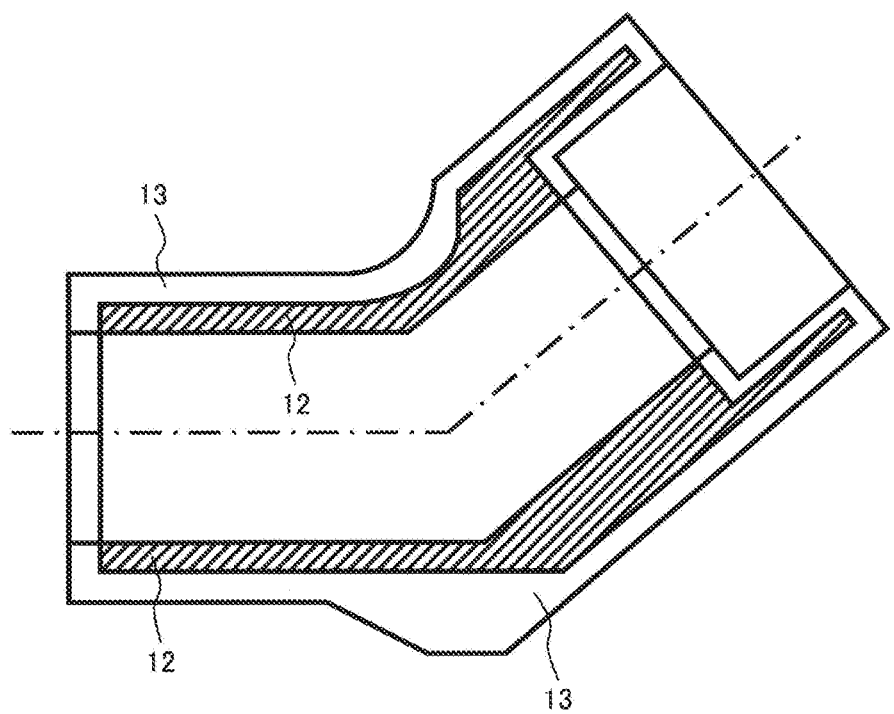
FIG. 6 is a diagram illustrating the hollow metal part according to an embodiment (third embodiment) of the present invention.

The hollow metal part according to a third embodiment of the present invention will now be described with reference to FIG. 6. FIG. 6 corresponds to FIG. 3 of the first embodiment and illustrates the structure of the hollow metal part 5 according to the third embodiment. In the third embodiment, the hollow metal part 5 is structured so that only the inner surfaces of the hollow metal part 5 are formed of stainless steel 12, and that the outer periphery of the hollow metal part 5 is covered with oxygen-free copper 13.

The hollow metal part 5 according to the present embodiment differs from the hollow metal part 5 according to the first embodiment (FIG. 3) or the second embodiment (FIG. 4) in that the opposing ends of the hollow metal part 5 are Mined without allowing stainless steel to split oxygen-free copper having low electrical resistance (high electrical conductivity). Therefore, the hollow metal part 5 according to the present embodiment can be used as a current-carrying part while allowing the stainless steel 12 to provide the bends of the hollow metal part 5 with increased mechanical strength.

Fourth Embodiment

Figure 7:
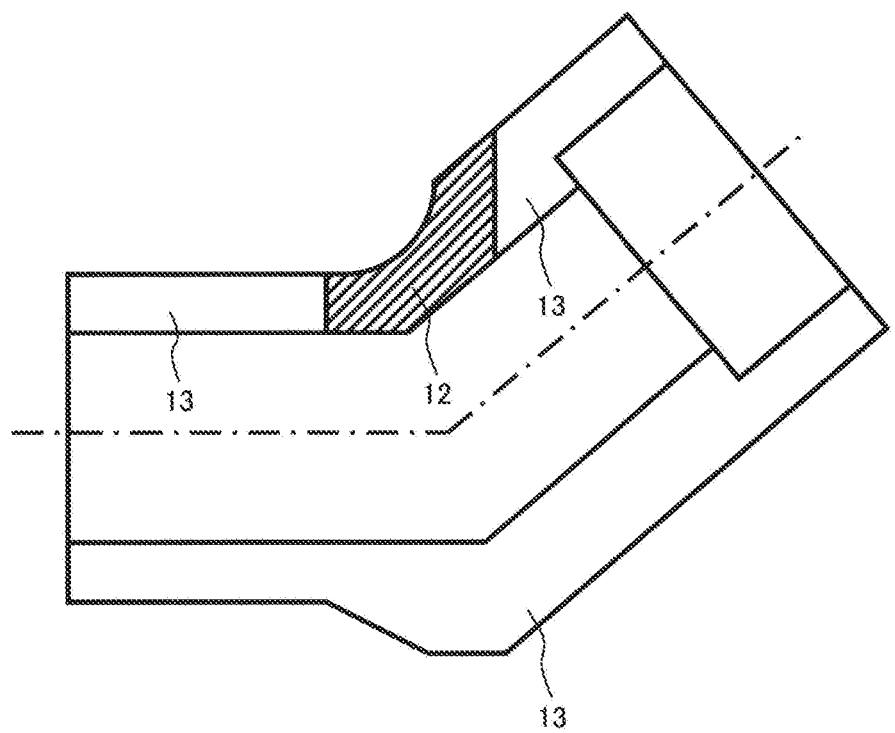
FIG. 7 is a diagram illustrating the hollow metal part according to an embodiment (fourth embodiment) of the present invention.

A hollow metal part according to a fourth embodiment of the present invention and the process for manufacturing the hollow metal part will now be described with reference to FIGS. 7 and 8. FIG. 7 corresponds to FIG. 3 of the first embodiment and illustrates the structure of the hollow metal part 5 according to the fourth embodiment. In the fourth embodiment, the hollow metal part 5 is configured so that only a part of the inside of the bends (highly stressed portions) of the hollow metal part 5 is formed of stainless steel 12, and that the other portions including the opposing ends of the hollow metal part 5 are made of oxygen-free copper 13. As is the case with the hollow metal part 5 according to the third embodiment, the hollow metal part 5 according to the fourth embodiment can be used as a current-carrying part because the opposing ends of the hollow metal part 5 are joined without allowing the stainless steel 12 to split the oxygen-free copper 13.

Figure 8:
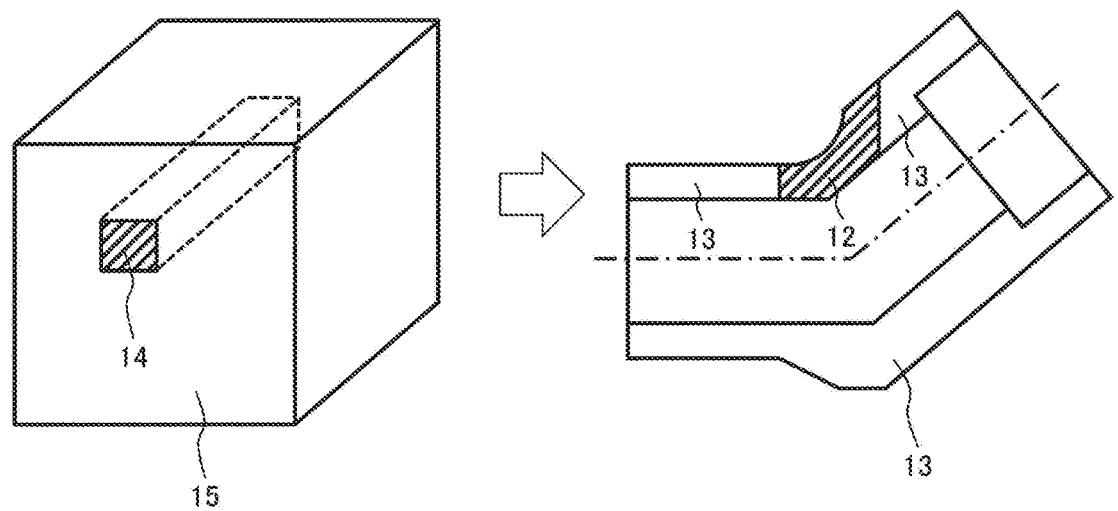
FIG. 8 is a diagram illustrating the process for manufacturing the hollow metal part according to an embodiment (fourth embodiment) of the present invention.

FIG. 8 is a conceptual diagram illustrating the process for manufacturing the hollow metal part 5 according to the fourth embodiment. In advance, the stainless steel block material 14 and the oxygen-free copper block materials 15 are formed. The stainless steel block material 14 corresponds to the bends (highly stressed portions) of the hollow metal part 5. The oxygen-free copper block materials 15 correspond to the opposing ends of the hollow metal part 5. Next, a bonding process is performed by HIP so that the stainless steel block material 14 is embedded in a part of the oxygen-free copper block materials 15. This HIP processing is performed by using the processing method described with reference, for example, to FIGS. 18A to 18F of the first embodiment. Finally, the hollow metal part 5 having a desired shape is cut out from the HIP-bonded block materials.

Fifth Embodiment

Figure 9:
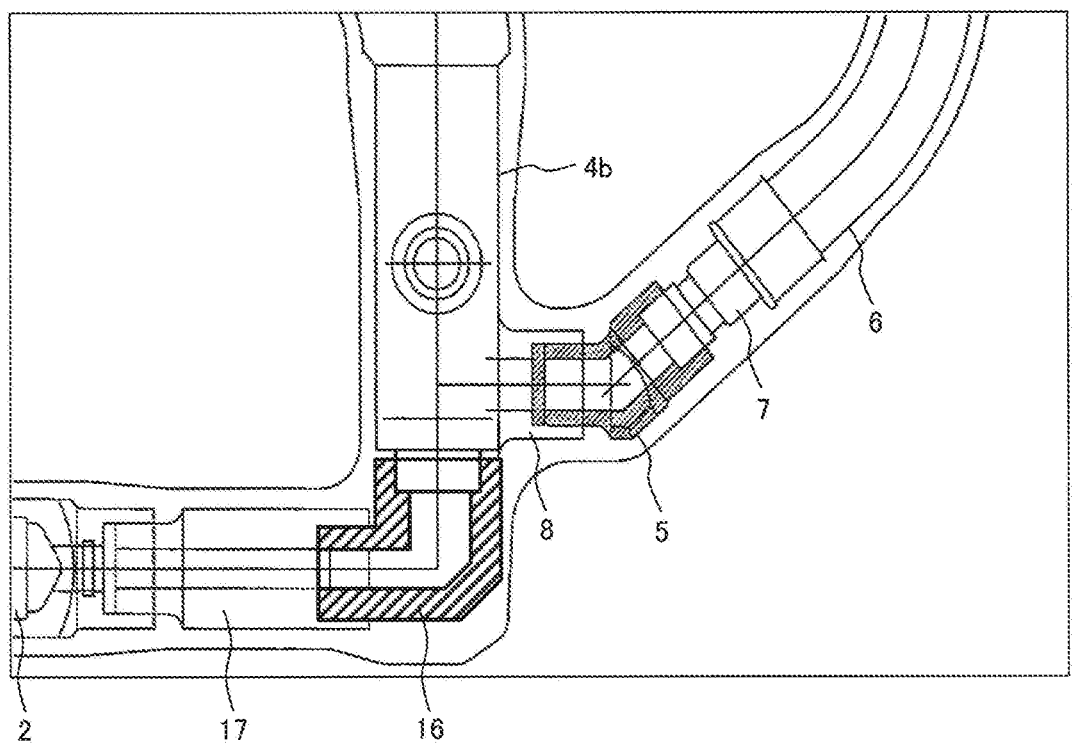
FIG. 9 is an enlarged view of detail A of FIG. 1.
Figure 10:
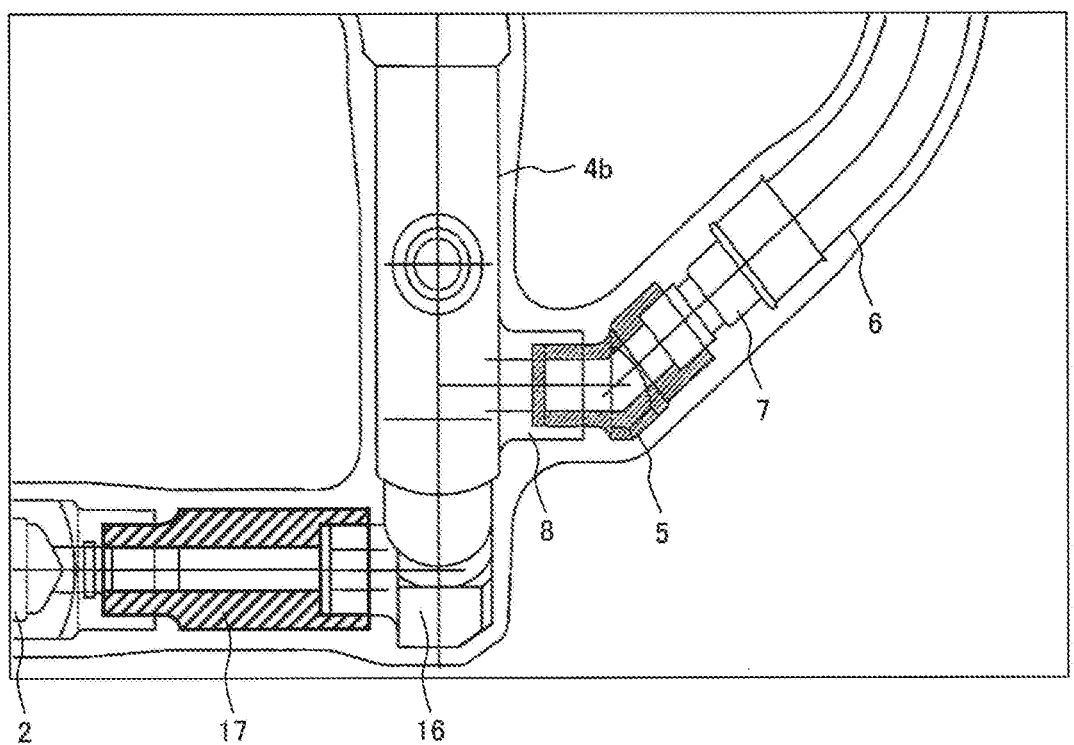
FIG. 10 is an enlarged view of detail A of FIG. 1.

A hollow metal part according to a fifth embodiment of the present invention and the process for manufacturing the hollow metal part will now be described with reference to FIGS. 9 to 12. FIGS. 9 and 10 both show an enlarged view of detail A of FIG. 1. As described above, the stator coil 2 and connection arm 4b of the rotating electrical machine are connected through the hollow metal part 16, 17, one end of the hollow metal part 16 serves as a socket, and the connection arm connecting port 8 interfacing with the connection arm 4b is inserted into the socket and connected to the socket by brazing. Meanwhile, the other end of the hollow metal part 16, which is to be connected to the stator coil 2, is inserted into the hollow metal part 17 and braze-connected to the hollow metal part 17. Further, as shown in FIG. 10, the other end of the hollow metal part 17 is inserted into a clip portion of the stator coil 2 and braze-connected to the stator coil 2.

Figure 11:
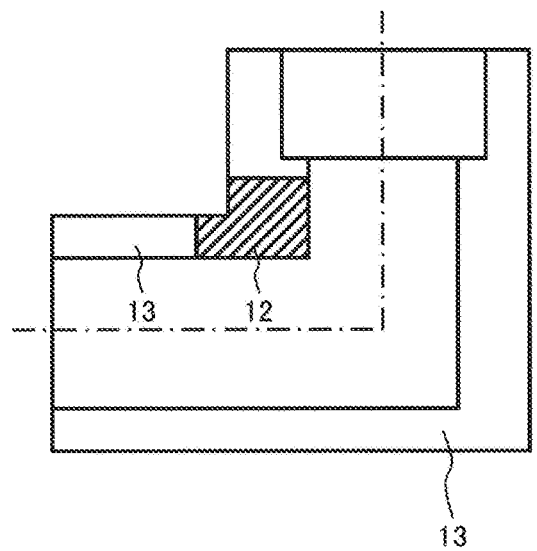
FIG. 11 is a diagram illustrating the hollow metal part according to an embodiment (fifth embodiment) of the present invention.

FIG. 11 illustrates the structure of the hollow metal part 16 according to the fifth embodiment, which corresponds to the hollow metal part 16 shown in FIG. 9. In the present embodiment, the hollow metal part 5 is configured so that the bends of the hollow metal part 16 are bent at substantially right angles, and that only a part of the inside of the bends (highly stressed portions) of the hollow metal part 16 is formed of stainless steel 12 while the other portions including the opposing ends of the hollow metal part 16 are made of oxygen-free copper 13. As is the case with the hollow metal part according to the third or fourth embodiment, the hollow metal part 16 according to the fifth embodiment can be used as a current-carrying part because the opposing ends of the hollow metal part 16 are joined without allowing the stainless steel 12 to split the oxygen-free copper 13.

Figure 12:
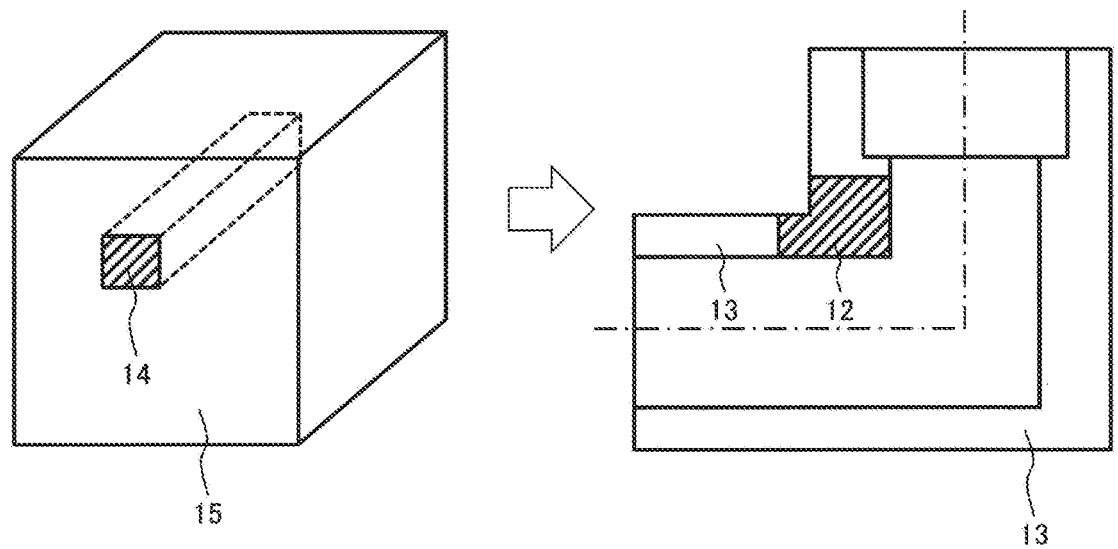
FIG. 12 a diagram illustrating the process for manufacturing the hollow metal part according to an embodiment (fifth embodiment) of the present invention.

FIG. 12 is a conceptual diagram illustrating the process for manufacturing the hollow metal part 16 according to the fifth embodiment. In advance, the stainless steel block material 14 and the oxygen-free copper block materials 15 are formed. The stainless steel block material 14 corresponds to the bends (highly stressed portions) of the hollow metal part 16. The oxygen-free copper block materials 15 correspond to the opposing ends of the hollow metal part 16. Next, a bonding process is performed by HIP so that the stainless steel block material 14 is embedded in a part of the oxygen-free copper block materials 15. This HIP processing is performed by using the processing method described with reference, for example, to FIGS. 18A to 18F of the first embodiment. The hollow metal part 16 having a desired shape is cut out from the HIP-bonded block materials.

Sixth Embodiment

Figure 13:
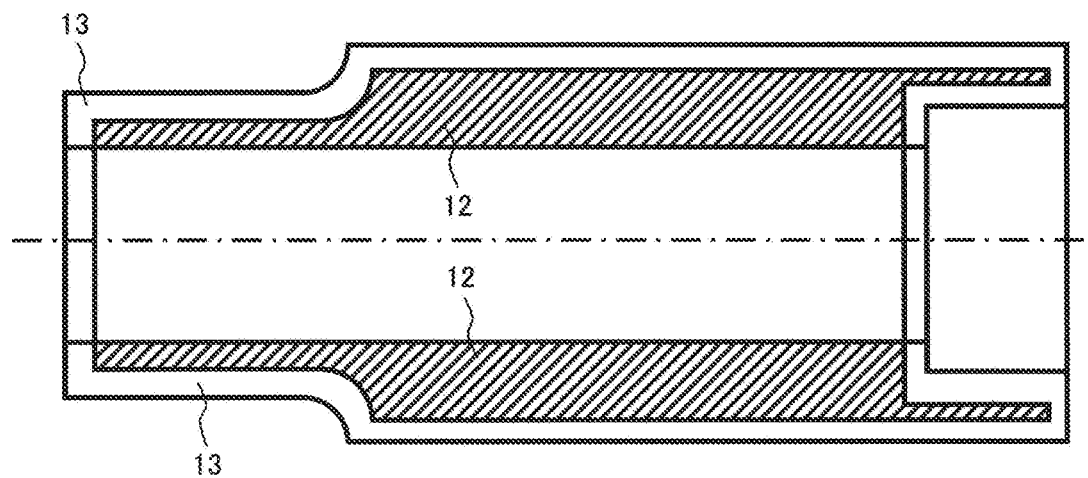
FIG. 13 is a diagram illustrating the hollow metal part according to an embodiment (sixth embodiment) of the present invention.

The hollow metal part according to a sixth embodiment of the present invention will now be described with reference to FIG. 13. FIG. 13 illustrates the structure of the hollow metal part 17 according to the sixth embodiment, which corresponds to the hollow metal part 17 shown in FIG. 10. In the present embodiment, the hollow metal part 17 is structured so that only the inner surfaces of the hollow metal part 17 are formed of stainless steel 12, and that the outer periphery of the hollow metal part 17 is covered with oxygen-free copper 13. The stainless steel 12 and the oxygen-free copper 13 are HIP-processed by the processing method described with reference, for example, to FIGS. 18A to 18F of the first embodiment. As is the case with the hollow metal part according to the third, fourth, or fifth embodiment, the hollow metal part 17 according to the sixth embodiment can be used as a current-carrying part because the opposing ends of the hollow metal part 17 are joined without allowing the stainless steel 12 to split the oxygen-free copper 13.

Seventh Embodiment

Figure 14:
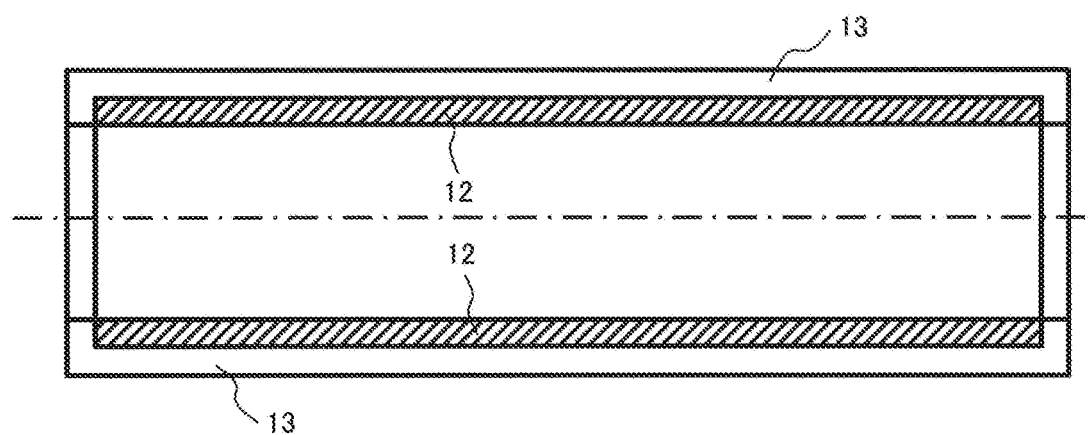
FIG. 14 is a diagram illustrating the hollow metal part according to an embodiment (seventh embodiment) of the present invention.

The hollow metal part according to a seventh embodiment of the present invention will now be described with reference to FIG. 14. FIG. 14 illustrates a modified version of the hollow metal part 17 shown in FIG. 13 of the sixth embodiment. The seventh embodiment is an example applied to a structure that is obtained by inserting the opposing ends of the hollow metal part 17 into their respective mating parts and connecting them by brazing. In the present embodiment, too, the stainless steel 12 and the oxygen-free copper 13 are HIP-processed by the processing method described with reference, for example, to FIGS. 18A to 18F of the first embodiment.

As is the case with the hollow metal part according to sixth embodiment, the hollow metal part 17 according to the present embodiment can be used as a current-carrying part because the opposing ends of the hollow metal part 17 are joined without allowing the stainless steel 12 to split the oxygen-free copper 13.

Eighth Embodiment

Figure 15:
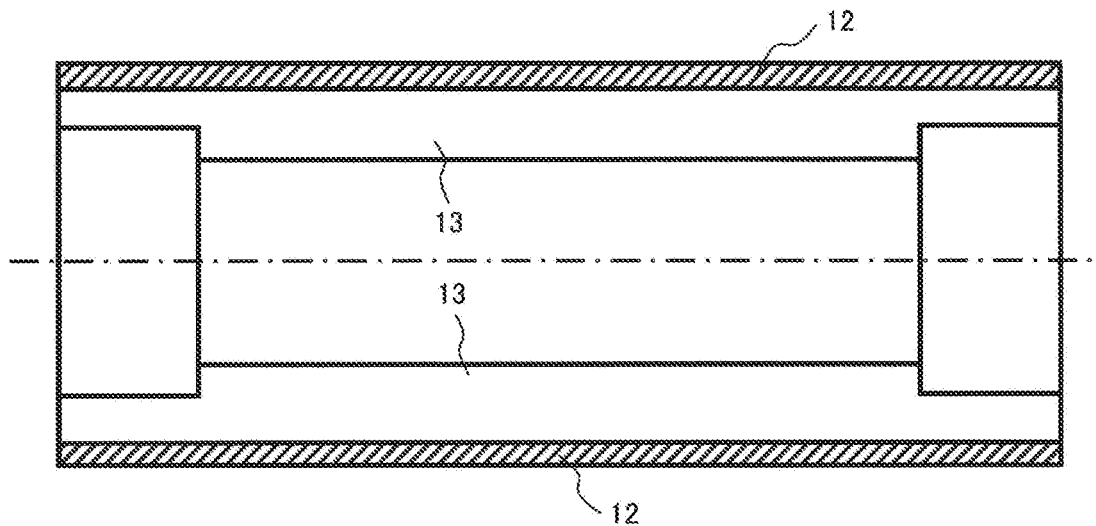
FIG. 15 is a diagram illustrating the hollow metal part according to an embodiment (eighth embodiment) of the present invention.
Figure 16:
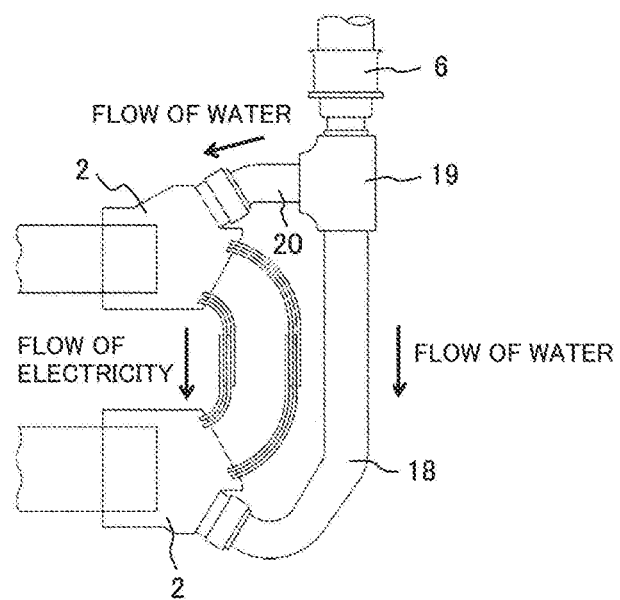
FIG. 16 is a diagram illustrating an exemplary piping structure of a related-art rotating electrical machine.
Figure 17:
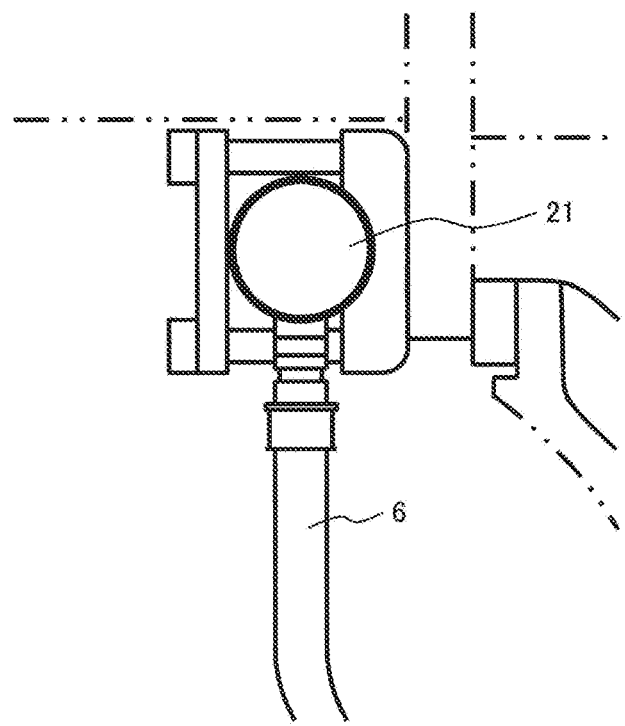
FIG. 17 is an enlarged view of detail B of FIG. 1.

The hollow metal part according to an eighth embodiment of the present invention will now be described with reference to FIG. 15. FIG. 15 illustrates a modified version of the hollow metal part 17 shown in FIG. 13 of the sixth embodiment. The eighth embodiment is an example applied to a structure that is obtained by inserting respective mating nipples into the opposing ends of the hollow metal part 17 and connecting them by brazing. In the present embodiment, too, the stainless steel 12 and the oxygen-free copper 13 are HIP-processed by the processing method described with reference, for example, to FIGS. 18A to 18F of the first embodiment.

The hollow metal part 17 according to the present embodiment is structured so that only the outer surfaces of the hollow metal part 17 are formed of stainless steel 12, and that the inner periphery of the hollow metal part 17 is covered with oxygen-free copper 13. As is the case with the hollow metal part according to the sixth or seventh embodiment, the hollow metal part 17 according to the present embodiment can be used as a current-carrying part because the opposing ends of the hollow metal part 17 are joined without allowing the stainless steel 12 to split the oxygen-free copper 13.

The present invention is not limited to the foregoing embodiments, but includes various modifications. For example, the foregoing embodiments have been described in detail in order to facilitate the understanding of the present invention, and the present invention is not necessarily limited to embodiments including all the described elements. Some of the above-described elements of a foregoing embodiment may be replaced by the elements of another embodiment. Further, the elements of a foregoing embodiment may be added to the elements of another embodiment. Furthermore, some elements of each embodiment may be deleted, subjected to the addition of other elements, or replaced by other elements.

DESCRIPTION OF REFERENCE NUMERALS

1 . . . Stator core
2 . . . Stator coil
3 . . . Stator coil end portion
4a . . . Connection ring
4b . . . Connection arm
5 . . . Hollow metal part (first)
6 . . . Insulating hose
7 . . . Nipple
8 . . . Connection arm connecting port
9 . . . Stainless steel hollow metal part body (elbow body)
10 . . . Cup made of oxygen-free copper
11 . . . Sleeve made of oxygen-free copper
12 . . . Stainless steel (austenite)
13 . . . Oxygen-free copper
14 . . . Stainless steel block material
15 . . . Oxygen-free copper block material
16 . . . Hollow metal part (second)
17 . . . Hollow metal part (third)
18 . . . Pipe component
19 . . . Branch connection
20 . . . Pipe component
21 . . . Header pipe
22 . . . Steel capsule
23 . . . Piping
24 . . . Metal material
25 . . . HIP processing equipment
26 . . . Machining device
27 . . . Through hole
100 . . . Water-cooled rotating electrical machine
101 . . . Stator coil (stator winding)
102 . . . Stator core
103 . . . Rotor
104 . . . End bracket
105 . . . Brush gear
106 . . . Footing
107 . . . High voltage bushing
108 . . . Current transformer
109 . . . Hydrogen cooler

What is claimed is:

1. A hollow metal part of a stator of a rotating electrical machine that is used as a pipe component for a refrigerant flow path of the rotating electrical machine adapted to cool a stator coil with a refrigerant,
wherein the rotating electrical machine includes a connection arm and an insulating hose at a stator coil end portion of the stator coil, the connection arm is coupled to the stator coil, the insulating hose being coupled to the stator coil and the connection arm through a first hollow metal part in order to supply the refrigerant to the stator coil and the connection arm; and wherein the first hollow metal part includes a bend, a first end coupled to one end of the bend, and a second end coupled to the other end of the bend, wherein at least a part of the bend is formed of stainless steel, wherein the first end and the second end are formed of oxygen-free copper, and wherein the first hollow metal part is formed integrally by joining a portion formed of stainless steel at the bent portion and portions of the first end and the second end formed of oxygen free copper by HIP diffusion bonding.

2. The hollow metal part according to claim 1, wherein the first hollow metal part includes an elbow body formed of stainless steel, a sleeve made of oxygen-free copper and coupled to one end of the elbow body, and a cup made of oxygen-free copper and coupled to the other end of the elbow body.

3. The hollow metal part according to claim 1, wherein the first hollow metal part includes an inner periphery formed of stainless steel and an outer periphery made of oxygen-free copper to cover the outer circumference of the inner periphery.

4. The hollow metal part according to claim 1, wherein the inside of the bend is formed of stainless steel, and the other portion is made of oxygen-free copper; and wherein the opposing ends of the hollow metal part are continuously joined by the oxygen-free copper.

5. The hollow metal part according to claim 1, further comprising a second hollow metal part that couples the stator coil to the connection arm and is bent at substantially right angles, wherein the inside of the bend of the second hollow metal part is formed of stainless steel and the other portion is made of oxygen-free copper.

6. The hollow metal part according to claim 5, further comprising a third hollow metal part that couples the stator coil to the second hollow metal part, wherein the third hollow metal part includes:

an inner periphery formed of stainless steel; and an outer periphery made of oxygen-free copper to cover the outer circumference of the inner periphery.

7. The hollow metal part according to claim 6, wherein the third hollow metal part allows a connection target member to be inserted into the opposing ends of the third hollow metal part and is braze-joined to the connection target member.

8. The hollow metal part according to claim 5, further comprising a third hollow metal part that couples the stator coil to the second hollow metal part, wherein the third hollow metal part includes:

an inner periphery made of oxygen-free copper; and an outer periphery formed of stainless steel to cover the outer circumference of the inner periphery; and wherein the third hollow metal part allows a nipple, that is, a connection target member, to be inserted into the opposing ends of the third hollow metal part and is braze-joined to the connection target member.

9. A rotating electrical machine wherein a stator coil is formed with a hollow strand and liquid flows into the hollow strand to cool the stator coil and a connection arm, wherein the hollow metal part of the stator of the rotating electrical machine according to claim 1 is used as a flow path of the liquid.

* * * * *